US012801122B2

(12) United States Patent
Handa

(10) Patent No.: US 12,801,122 B2
(45) Date of Patent: Nov. 17, 2026

(54) METHOD OF CONTROLLING HYDROGEN FILLING APPARATUS AND HYDROGEN FILLING APPARATUS

(71) Applicant: HONDA MOTOR CO., LTD., Tokyo (JP)

(72) Inventor: Kiyoshi Handa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 671 days.

(21) Appl. No.: 17/962,846

(22) Filed: Oct. 10, 2022

(65) Prior Publication Data

US 2023/0119413 A1 Apr. 20, 2023

(30) Foreign Application Priority Data

Oct. 18, 2021 (JP) ................................ 2021-170045

(51) Int. Cl.
*G05B 19/00* (2006.01)
*F17C 5/00* (2006.01)
(Continued)

(52) U.S. Cl.
CPC ............ *G05B 19/416* (2013.01); *F17C 5/007* (2013.01); *F17C 5/06* (2013.01); *F17C 13/026* (2013.01);
(Continued)

(58) Field of Classification Search
CPC ........ G05B 19/416; G05B 2219/45076; F17C 5/007; F17C 5/06; F17C 5/026;
(Continued)

(56) References Cited

U.S. PATENT DOCUMENTS

2007/0257043 A1 11/2007 Kanoya et al.
2010/0294393 A1 11/2010 Allidieres et al.
(Continued)

FOREIGN PATENT DOCUMENTS

CN 102472432 A 5/2012
CN 102947636 A 2/2013
(Continued)

OTHER PUBLICATIONS

Li et al. (A study on the prediction of the temperature and mass of hydrogen gas inside a tank during fast filling process, Nov. 8, 2020) (Year: 2020).*
(Continued)

*Primary Examiner* — Aleksey Olshannikov
(74) *Attorney, Agent, or Firm* — Carrier, Shende & Associates P.C.; Joseph P. Carrier; Jeffrey T. Gedeon

(57) ABSTRACT

A method of controlling a hydrogen filling apparatus for filling a hydrogen tank of a vehicle with hydrogen includes estimating a temperature of hydrogen inside the hydrogen tank during filling of the hydrogen tank with hydrogen, predicting that overheating of hydrogen inside the hydrogen tank will occur before the hydrogen tank is fully filled, if the estimated temperature of hydrogen inside the hydrogen tank becomes higher than a determination curve, and, if it is predicted that the overheating will occur, suppressing a filling speed of hydrogen so as to be lower than before it is predicted that the overheating will occur.

10 Claims, 5 Drawing Sheets

(51) Int. Cl.
*F17C 5/06* (2006.01)
*F17C 13/02* (2006.01)
*G05B 19/416* (2006.01)

(52) U.S. Cl.
CPC .. *F17C 2221/012* (2013.01); *F17C 2250/032* (2013.01); *F17C 2250/0439* (2013.01); *F17C 2250/0636* (2013.01); *F17C 2250/0694* (2013.01); *F17C 2260/023* (2013.01); *F17C 2265/065* (2013.01); *F17C 2270/0168* (2013.01); *F17C 2270/0184* (2013.01); *G05B 2219/45076* (2013.01)

(58) Field of Classification Search
CPC .............. F17C 2260/023; F17C 13/026; F17C 2221/012; F17C 2250/032; F17C 2250/0439; F17C 2250/0636; F17C 2250/0694; F17C 2265/065; F17C 2270/0168; F17C 2270/0184; Y02E 60/32
See application file for complete search history.

(56) References Cited

U.S. PATENT DOCUMENTS

| | | | | |
|---|---|---|---|---|
| 2011/0259469 | A1 | 10/2011 | Harty et al. | |
| 2012/0125480 | A1 | 5/2012 | Inagi et al. | |
| 2014/0196814 | A1 | 7/2014 | Nagura et al. | |
| 2014/0311622 | A1 | 10/2014 | Cohen | |
| 2015/0184804 | A1 | 7/2015 | Handa | |
| 2019/0153985 | A1* | 5/2019 | Handa | F02M 21/0206 |
| 2020/0223684 | A1 | 7/2020 | Natori et al. | |
| 2021/0062973 | A1* | 3/2021 | Fukunaga | F17C 5/007 |

FOREIGN PATENT DOCUMENTS

| | | | |
|---|---|---|---|
| CN | 103492785 | A | 1/2014 |
| CN | 104110578 | A | 10/2014 |
| CN | 109812695 | A | 5/2019 |
| CN | 111442185 | A | 7/2020 |
| JP | 2007-147005 | A | 6/2007 |
| JP | 2014-214874 | A | 11/2014 |
| JP | 2015-124830 | A | 7/2015 |

OTHER PUBLICATIONS

Bourgeois et al. Evaluating the temperature inside a tank during a filling with highly-pressurized gas, 2015) (Year: 2015).*

Wu et al. (Fast filling strategy of type III on-board hydrogen tank based on time-delayed method), Feb. 10, 2021 (Year: 2021).*

Office Action dated Jul. 30, 2024 issued in the corresponding Japanese Patent Application No. 2021-170045 with the English machine translation thereof.

Office Action dated Feb. 27, 2025 issued in the corresponding Chinese Patent Application No. 202211274994.7 with the English machine translation thereof.

* cited by examiner

METHOD OF CONTROLLING HYDROGEN FILLING APPARATUS AND HYDROGEN FILLING APPARATUS

CROSS-REFERENCE TO RELATED APPLICATIONS

This application is based upon and claims the benefit of priority from Japanese Patent Application No. 2021-170045 filed on Oct. 18, 2021, the contents of which are incorporated herein by reference.

BACKGROUND OF THE INVENTION

Field of the Invention

The present invention relates to a method of controlling a hydrogen filling apparatus, and a hydrogen filling apparatus.

Description of the Related Art

JP 2007-147005 A discloses a hydrogen filling apparatus. The hydrogen filling apparatus fills hydrogen into a hydrogen tank of a fuel cell vehicle. The hydrogen filling apparatus performs filling control of hydrogen based on the temperature inside the hydrogen tank. The temperature inside the hydrogen tank is measured by a temperature measuring means installed inside the hydrogen tank.

SUMMARY OF THE INVENTION

In the technique disclosed in JP 2007-147005 A, hydrogen filling control is performed based on the temperature inside the hydrogen tank sent from the fuel cell vehicle. Therefore, when the temperature inside the hydrogen tank sent from the fuel cell vehicle is not correct due to illegal modification or the like of the fuel cell vehicle, there is a possibility that the hydrogen filling control cannot be appropriately performed.

An object of the present invention is to solve the aforementioned problem.

According to a first aspect of the present invention, there is provided a method of controlling a hydrogen filling apparatus configured to fill a hydrogen tank of a vehicle with hydrogen, the method including: a determination curve acquisition step of acquiring a determination curve from a storage unit, the determination curve being a time change model of a temperature of the hydrogen inside the hydrogen tank during filling of the hydrogen tank with the hydrogen; a filling start step of starting filling of the hydrogen tank with the hydrogen; a temperature estimation step of estimating the temperature of the hydrogen inside the hydrogen tank during filling of the hydrogen tank with the hydrogen; an overheat prediction step of predicting that overheating of the hydrogen inside the hydrogen tank will occur before the hydrogen tank is fully filled, if the temperature of the hydrogen inside the hydrogen tank estimated in the temperature estimation step becomes higher than the determination curve; and a filling speed suppressing step of, if it is predicted that the overheating will occur, suppressing a filling speed of the hydrogen so as to be lower than before it is predicted that the overheating will occur or stopping filling of the hydrogen tank with the hydrogen.

According to a second aspect of the present invention, there is provided a hydrogen filling apparatus for filling a hydrogen tank of a vehicle with hydrogen, the hydrogen filling apparatus including: a filling control unit configured to control a filling speed of the hydrogen; a determination curve acquisition unit configured to acquire a determination curve from a storage unit, the determination curve being a time change model of a temperature of the hydrogen inside the hydrogen tank during filling of the hydrogen tank with the hydrogen; a temperature estimation unit configured to estimate the temperature of the hydrogen inside the hydrogen tank during filling of the hydrogen tank with the hydrogen; and an overheat prediction unit configured to predict that overheating of the hydrogen inside the hydrogen tank will occur before the hydrogen tank is fully filled, if the temperature of the hydrogen inside the hydrogen tank estimated by the temperature estimation unit becomes higher than the determination curve, wherein if it is predicted that the overheating will occur, the filling control unit suppresses the filling speed of the hydrogen so as to be lower than before it is predicted that the overheating will occur or stops filling of the hydrogen tank with the hydrogen.

According to the present invention, it is possible to appropriately perform hydrogen filling control.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

First Embodiment

[Configuration of Fuel Cell Vehicle and Hydrogen Filling Apparatus]

Figure 1:
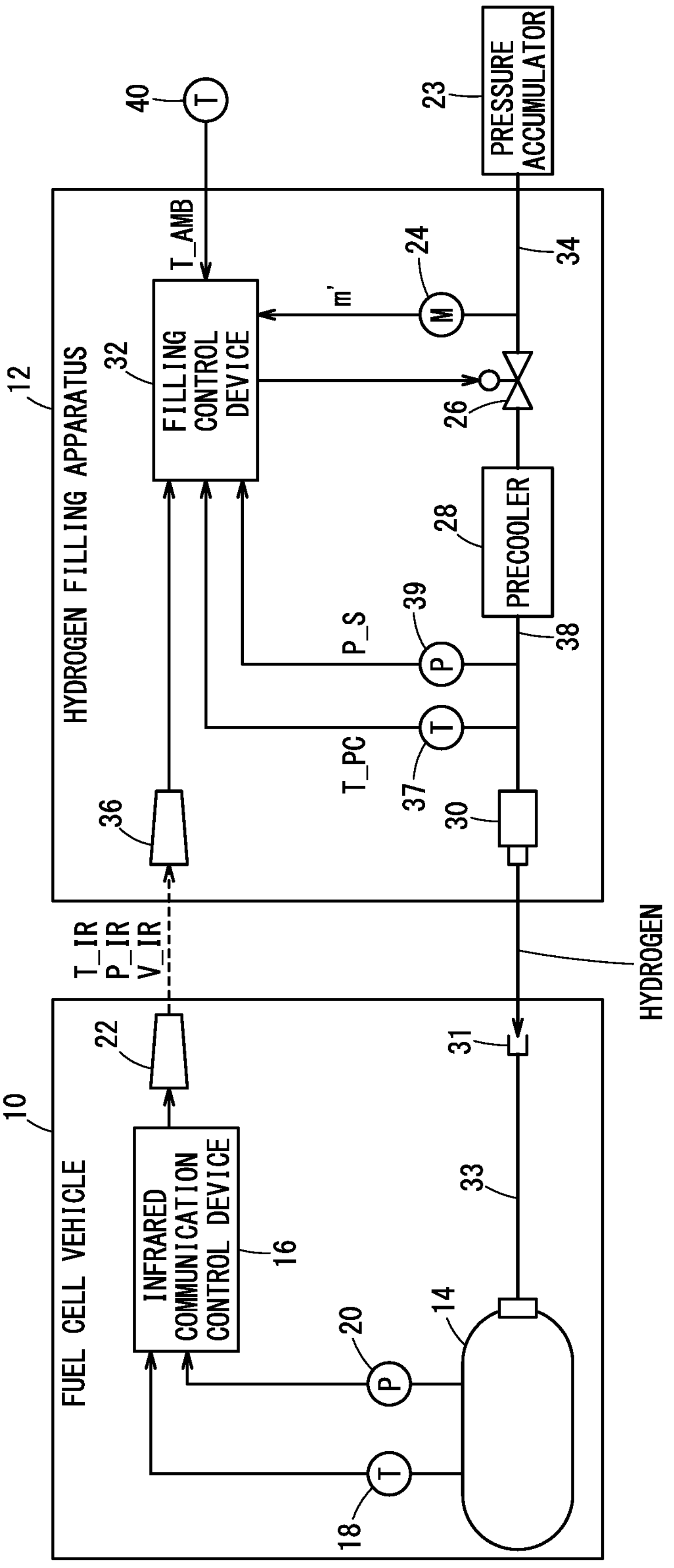
FIG. 1 is a schematic view of a fuel cell vehicle and a hydrogen filling apparatus.

FIG. 1 is a schematic view of a fuel cell vehicle 10 and a hydrogen filling apparatus 12. The hydrogen filling apparatus 12 fills a hydrogen tank 14 of the fuel cell vehicle 10 with hydrogen. The hydrogen filling apparatus 12 is installed in a hydrogen station. The fuel cell vehicle 10 corresponds to a vehicle of the present invention.

The fuel cell vehicle 10 has an infrared communication control device 16. A temperature of hydrogen inside the hydrogen tank 14 (hereinafter referred to as a gas temperature) and a pressure of hydrogen inside the hydrogen tank 14 (hereinafter referred to as a gas pressure) are input to the infrared communication control device 16. The gas temperature is detected by a gas temperature detection unit 18 provided in the hydrogen tank 14. The gas pressure is detected by a gas pressure detection unit 20. The gas pressure detection unit 20 is provided in the hydrogen tank 14 or a fuel pipe 33 connected to the hydrogen tank 14.

The infrared communication control device 16 controls a transmitter 22 to transmit the inputted gas temperature and gas pressure to the hydrogen filling apparatus 12 by infrared communication. Hereinafter, the gas temperature transmitted from the transmitter 22 to the hydrogen filling apparatus 12 is referred to as a gas temperature T_IR. Further, the gas pressure transmitted from the transmitter 22 to the hydrogen filling apparatus 12 is referred to as a gas pressure P_IR. The infrared communication control device 16 controls the transmitter 22 to transmit the capacity of the hydrogen tank 14 to the hydrogen filling apparatus 12 by infrared communication. The capacity of the hydrogen tank 14 is a fixed value determined from the hydrogen tank 14 mounted on the fuel cell vehicle 10. Hereinafter, the capacity of the hydrogen tank 14 transmitted from the transmitter 22 to the hydrogen filling apparatus 12 is referred to as a tank capacity V_IR.

The hydrogen filling apparatus 12 includes a mass flow meter 24, a regulating valve 26, a precooler 28, a nozzle 30, and a filling control device 32.

The mass flow meter 24 measures a mass flow rate m' of hydrogen sent to the precooler 28 from a pressure accumulator 23 provided in the hydrogen station in which the hydrogen filling apparatus 12 is installed. The regulating valve 26 is provided in a first supply pipe 34 that connects the mass flow meter 24 and the precooler 28. The regulating valve 26 regulates a rate (speed) at which hydrogen is filled from the hydrogen filling apparatus 12 to the hydrogen tank 14 (hereinafter referred to as a filling rate or filling speed). The precooler 28 cools the hydrogen to about −40° C. The nozzle 30 is connected to a hydrogen filling port 31 of the fuel cell vehicle 10. The hydrogen cooled in the precooler 28 is filled into the hydrogen tank 14 from the nozzle 30. The precooler 28 corresponds to a cooling unit of the present invention.

The filling control device 32 controls the regulating valve 26 to adjust the filling speed. The filling speed is adjusted according to a predetermined filling protocol. The gas temperature T_IR, the gas pressure P_IR and the tank capacity V_IR received by a receiver 36 are input to the filling control device 32. The mass flow rate m', a precooling temperature T_PC, a filling pressure P_S, and an outside air temperature T_AMB are input to the filling control device 32. The precooling temperature T_PC is the temperature of the hydrogen discharged from the precooler 28 to a second supply pipe 38. The second supply pipe 38 connects the precooler 28 and the nozzle 30. The precooling temperature T_PC is detected by a precooling temperature detection unit 37 provided in the second supply pipe 38. The filling pressure P_S is the pressure of hydrogen in the second supply pipe 38. The filling pressure P_S is detected by a filling pressure detection unit 39 provided in the second supply pipe 38. T_AMB is the outside air temperature. The outside air temperature T_AMB is detected by an outside air temperature detection unit 40 provided in the hydrogen station in which the hydrogen filling apparatus 12 is installed.

[Detailed Configuration of Filling Control Device]

Figure 2:
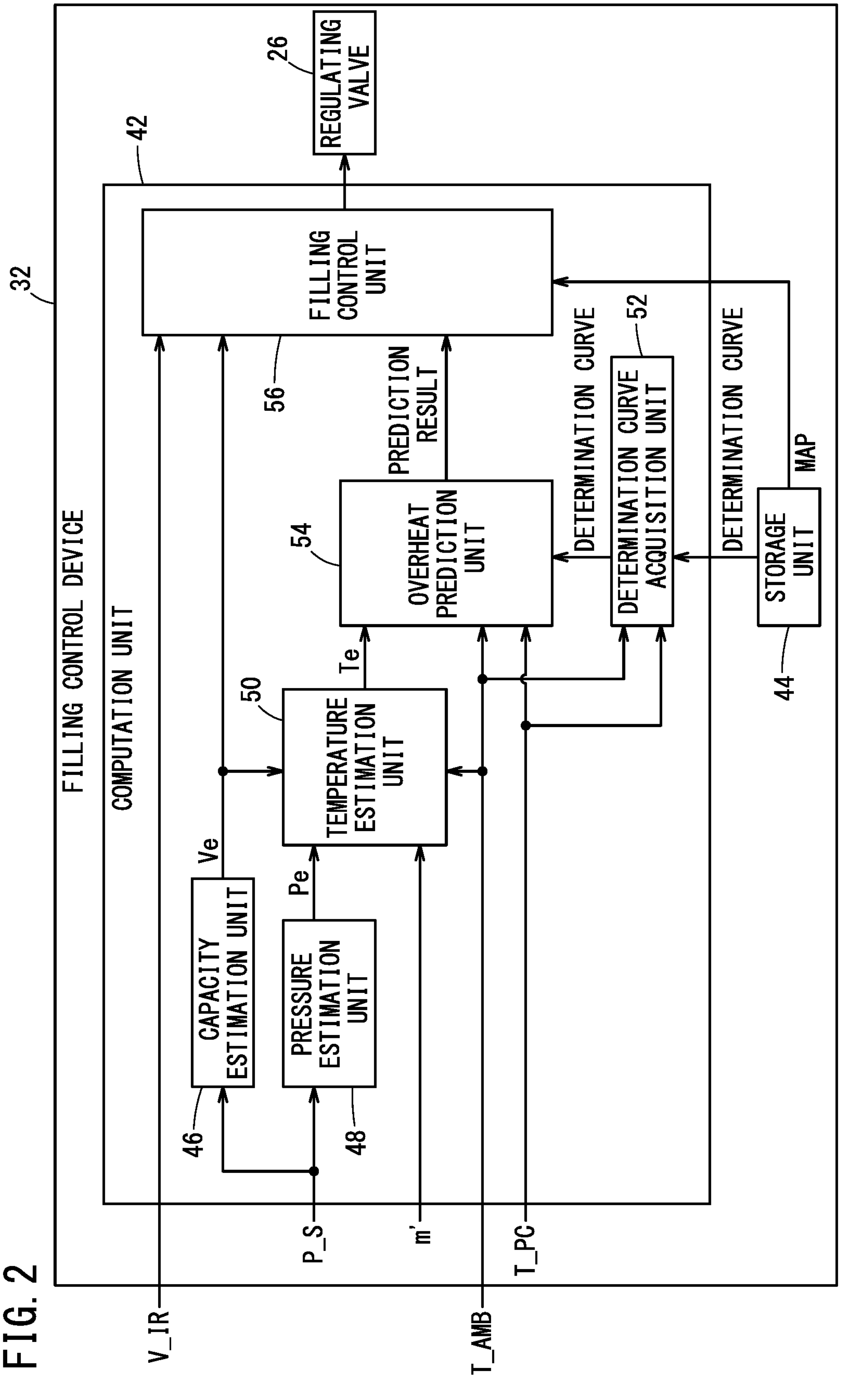
FIG. 2 is a control block diagram of a filling control device.

FIG. 2 is a control block diagram of the filling control device 32. The filling control device 32 includes a computation unit 42 and a storage unit 44.

The computation unit 42 is, for example, a processor such as a central processing unit (CPU) or a graphics processing unit (GPU). The computation unit 42 includes a capacity estimation unit 46, a pressure estimation unit 48, a temperature estimation unit 50, a determination curve acquisition unit 52, an overheat prediction unit 54, and a filling control unit 56. The computation unit 42 executes programs stored in the storage unit 44, whereby the capacity estimation unit 46, the pressure estimation unit 48, the temperature estimation unit 50, the determination curve acquisition unit 52, the overheat prediction unit 54, and the filling control unit 56 are realized. At least a part of the capacity estimation unit 46, the pressure estimation unit 48, the temperature estimation unit 50, the determination curve acquisition unit 52, the overheat prediction unit 54, and the filling control unit 56 may be realized by an integrated circuit such as an application specific integrated circuit (ASIC) or a field-programmable gate array (FPGA). At least a part of the capacity estimation unit 46, the pressure estimation unit 48, the temperature estimation unit 50, the determination curve acquisition unit 52, the overheat prediction unit 54, and the filling control unit 56 may be realized by an electronic circuit including a discrete device.

The storage unit 44 includes a volatile memory (not illustrated) and a non-volatile memory (not illustrated). The volatile memory is, for example, a random access memory (RAM) or the like. The volatile memory is used as a working memory of the processor, and temporarily stores data and the like necessary for processing or calculation. The non-volatile memory is, for example, a read only memory (ROM), a flash memory, or the like. The non-volatile memory is used as a storage memory and stores programs, tables, maps, and the like. At least a part of the storage unit 44 may be included in the processor, the integrated circuit, or the like as described above.

The capacity estimation unit 46 estimates the capacity of the hydrogen tank 14 of the fuel cell vehicle 10. Before the full-scale filling is started, the capacity estimation unit 46 controls the regulating valve 26 to fill the hydrogen tank 14 with a small amount of hydrogen. In the following, this filling of the hydrogen tank with hydrogen is referred to as capacity measurement filling. The capacity estimation unit 46 estimates the capacity of the hydrogen tank 14 based on a change in the filling pressure P_S before and after the capacity measurement filling. Hereinafter, the capacity of the hydrogen tank 14 estimated by the capacity estimation unit 46 is referred to as an estimated tank capacity Ve. When the difference between the estimated tank capacity Ve and the tank capacity V_IR is within a predetermined error range, the tank capacity V_IR may be used as the estimated tank capacity Ve. In estimating the capacity of the hydrogen tank 14, it is preferable to consider the volume expansion of the hydrogen tank 14 due to the gas pressure inside the hydrogen tank 14.

The pressure estimation unit 48 estimates the gas pressure inside the hydrogen tank 14 of the fuel cell vehicle 10. The pressure estimation unit 48 estimates the gas pressure inside the hydrogen tank 14 before starting the capacity measurement filling and the gas pressure inside the hydrogen tank 14 at the time of hydrogen filling.

Before starting the capacity measurement filling, the pressure estimation unit 48 controls the regulating valve 26 to send a small amount of hydrogen into the second supply pipe 38. Hereinafter, this control will be referred to as pre-shot control. By the pre-shot control, the pressure of the hydrogen in the second supply pipe 38 and the pressure of the hydrogen inside the hydrogen tank 14 are equalized to each other. Thereafter, the pressure estimation unit 48 estimates an initial gas pressure which is a gas pressure of the hydrogen tank 14 before the capacity measurement filling.

During hydrogen filling, the pressure estimation unit 48 estimates the gas pressure inside the hydrogen tank 14 on the basis of the filling pressure P_S at the time when the flow rate of hydrogen in the second supply pipe 38 has become 0. During hydrogen filling, a hydrogen stop process for temporarily stopping hydrogen filling may be performed. The hydrogen stop process is executed when performing a hydrogen leakage check, switching of the pressure accumulator 23, or the like. The hydrogen stop process may be intentionally executed in order for the pressure estimation unit 48 to estimate the gas pressure inside the hydrogen tank 14. While the hydrogen stop process is performed, the flow rate of hydrogen in the second supply pipe 38 becomes 0. Hereinafter, the gas pressure estimated by the pressure estimation unit 48 is referred to as an estimated gas pressure Pe.

The hydrogen tank 14 and the second supply pipe 38 are connected to each other via the fuel pipe 33 of the fuel cell vehicle 10, the hydrogen filling port 31 of the fuel cell vehicle 10, and the nozzle 30 of the hydrogen filling apparatus 12. Therefore, after the pre-shot control, the pressure inside the hydrogen tank 14 is substantially the same as the filling pressure P_S of the second supply pipe 38. However, when hydrogen is flowing from the hydrogen filling apparatus 12 toward the hydrogen tank 14, pressure loss occurs in the second supply pipe 38 and the like. Therefore, the pressure estimation unit 48 estimates the pressure inside the hydrogen tank 14 based on the filling pressure P_S at the time when the flow rate of hydrogen inside the second supply pipe 38 has become 0.

The temperature estimation unit 50 estimates the gas temperature inside the hydrogen tank 14 of the fuel cell vehicle 10. Hereinafter, the gas temperature estimated by the temperature estimation unit 50 is referred to as an estimated gas temperature Te. The estimated gas temperature Te is obtained by the following equation (1).

$$Te = \frac{Pe \cdot Ve}{Z(Pe, Te) \cdot (m0 + \mathrm{dm}) \cdot R} \tag{1}$$

Z in the equation (1) is the compressibility factor of hydrogen. R in the equation (1) is the gas constant. The compressibility factor Z is obtained from the pressure of hydrogen and the temperature of hydrogen. In the equation (1), the estimated gas pressure Pe is used as the pressure of hydrogen, and the estimated gas temperature Te is used as the temperature of hydrogen. Here, the estimated gas temperature Te is an absolute temperature, and the unit thereof is [K (kelvin)].

In the equation (1), m0 represents the mass of hydrogen inside the hydrogen tank 14 before the hydrogen tank 14 is filled with hydrogen (hereinafter referred to as a gas mass). The gas mass m0 is obtained by the following equation (2).

$$m0 = Ve \times \rho(Pe0, Te0) \tag{2}$$

ρ in the equation (2) is the density of hydrogen inside the hydrogen tank 14. The density ρ are obtained based on the estimated gas pressures Pe0 and the estimated gas temperatures Te0. The estimated gas pressure Pe0 is an estimated value estimated by the pressure estimation unit 48 before the hydrogen tank 14 is filled with hydrogen. The estimated gas temperature Te0 is an estimated value estimated by the temperature estimation unit 50 before the hydrogen tank 14 is filled with hydrogen. The estimated gas temperature Te0 is obtained by the following equation (3). T_hotsoak in the equation (3) is a correction value defined according to SAE J2601.

$$Te0 = T\_amb + T\_\mathrm{hotsoak} \tag{3}$$

In the equation (1), dm is the mass (gas mass) of hydrogen filled in the hydrogen tank 14 from the time of start of filling of the hydrogen tank 14 with hydrogen till the present time. The gas mass dm is obtained by the following equation (4). t in the equation (4) is the length of time that has elapsed since start of filling of the hydrogen tank 14 with hydrogen (which will be hereinafter referred to as an elapsed time). However, this elapsed time does not include the time during which the pre-shot control is performed. This is because the mass of hydrogen (gas mass) filled into the hydrogen tank 14 by the pre-shot control is extremely small.

$$dm = \int_0^t m' dt \tag{4}$$

The right side of the equation (1) includes the estimated gas temperature Te that should be obtained by the equation (1). However, the estimated gas temperature Te can be caused to converge by using a method described below or the like. First, in the first calculation, the estimated gas temperature Te is obtained by substituting an appropriate value as a provisional temperature for the estimated gas temperature Te on the right side of the equation (1). Next, the estimated gas temperature Te is obtained by substituting the value of the estimated gas temperature Te obtained in the previous calculation for the estimated gas temperature Te on the right side in the equation (1). Such loop calculation is repeated several times.

Figure 3:
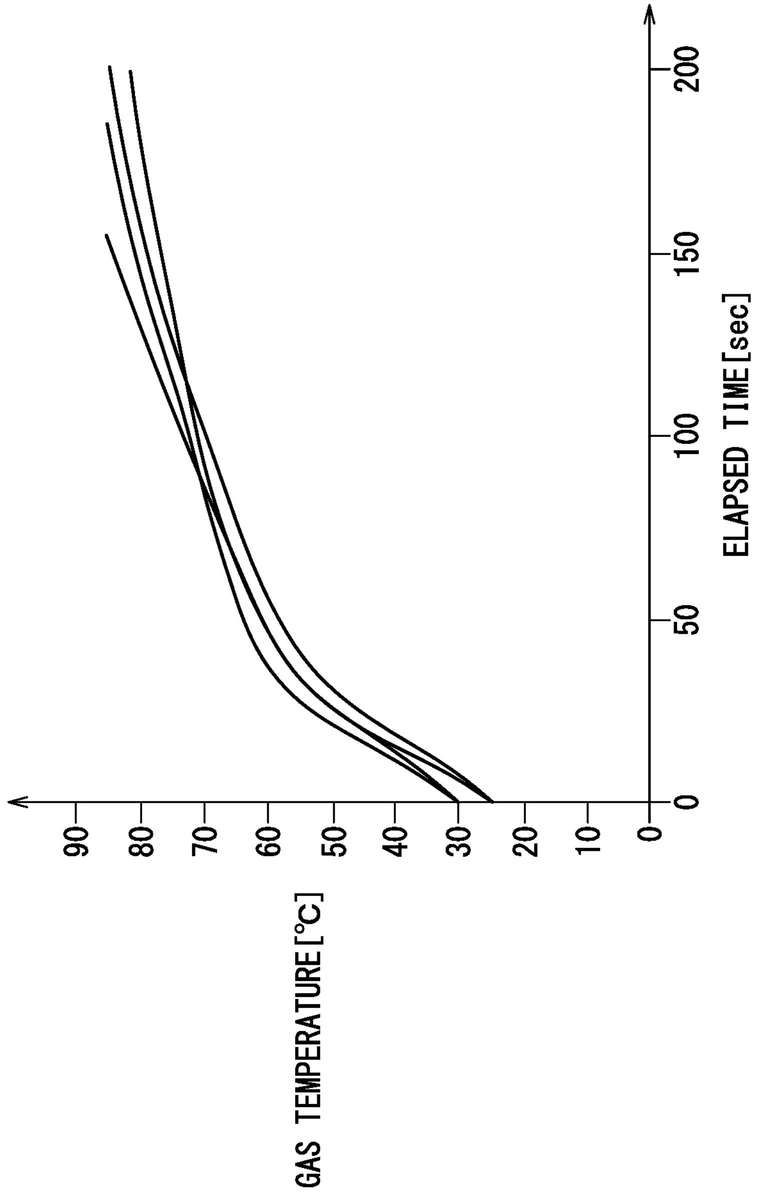
FIG. 3 is a graph showing a determination curve.

The determination curve acquisition unit 52 acquires a determination curve stored in the storage unit 44. FIG. 3 is a graph showing a determination curve. The determination curve represents a time change model of the gas temperature inside the hydrogen tank 14 during hydrogen filling. More specifically, the determination curve is a time change model in a case where the filling speed is increased as much as possible within a range in which the hydrogen tank 14 does not overheat. As shown in FIG. 3, the determination curve is a curve indicating a relationship between an elapsed time, which has elapsed since the start of filling of the hydrogen tank 14 with hydrogen, and a gas temperature inside the hydrogen tank 14. In a simulation performed in advance, a plurality of determination curves are obtained by changing the combination of the outside air temperature T_AMB and the precooling temperature T_PC of hydrogen at the time when filling of the hydrogen tank 14 with hydrogen is started. Although four determination curves are shown in FIG. 3, several hundred determination curves are actually obtained.

Each determination curve is approximated by a polynomial. The polynomial of each determination curve is stored in the storage unit 44 in association with a combination of the outside air temperature T_AMB and the precooling temperature T_PC at the time point at which filling of the hydrogen tank 14 with hydrogen is started. Since the storage unit 44 stores each determination curve as a polynomial, the amount of information of each determination curve can be reduced. Therefore, the storage unit 44 needs less storage space.

In a case where the storage unit 44 stores therein a determination curve corresponding to the combination of the outside air temperature T_AMB and the precooling temperature T_PC at the time point at which filling of the hydrogen tank 14 with hydrogen is started, the determination curve acquisition unit 52 acquires the determination curve from the storage unit 44. Next, the determination curve acquisition unit 52 outputs the acquired determination curve to the overheat prediction unit 54.

In a case where the storage unit 44 stores no determination curve corresponding to the combination of the outside air temperature T_AMB and the precooling temperature T_PC at the time point at which filling of the hydrogen tank 14 with hydrogen is started, the determination curve acquisition unit 52 generates a new determination curve. The determination curve acquisition unit 52 acquires, from the storage unit 44, a plurality of determination curves that satisfy both of the following conditions (A) and (B) among all the determination curves stored in the storage unit 44.

(A) The outside air temperature associated with the determination curve is within a predetermined temperature range with respect to the outside air temperature T_AMB.

(B) The precooling temperature associated with the determination curve is within a predetermined temperature range with respect to the precooling temperature T_PC.

The predetermined temperature range of each of the conditions (A) and (B) is set to a range of ±5° C., for example.

Figure 4:
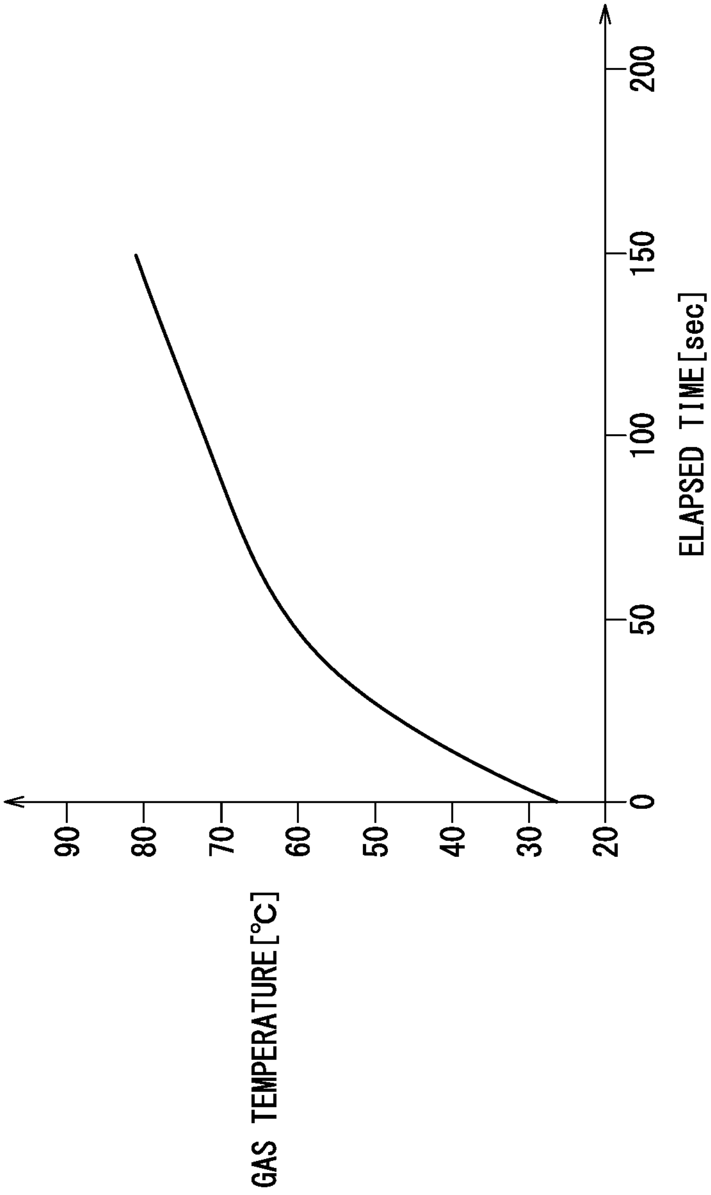
FIG. 4 is a graph showing a determination curve.

The determination curve acquisition unit 52 interpolates (for example, linearly interpolates) the acquired plurality of determination curves to generate a new determination curve. FIG. 4 is a graph showing a determination curve. The determination curve shown in FIG. 4 is a determination curve generated by interpolating the four determination curves shown in FIG. 3. The determination curve acquisition unit 52 outputs the generated determination curve to the overheat prediction unit 54.

When the estimated gas temperature Te becomes higher than the determination curve, the overheat prediction unit 54 predicts that overheating of hydrogen inside the hydrogen tank 14 will occur before the hydrogen tank 14 is fully filled.

The filling control unit 56 controls the regulating valve 26 based on the map acquired from the storage unit 44, to thereby adjust the filling speed.

A plurality of maps concerning the filling speed (hereinafter referred to as filling speed maps) are created according to the filling protocol. The storage unit 44 stores the plurality of created filling speed maps. Each of the plurality of filling speed maps is a map indicating a correspondence between the gas pressure of the hydrogen tank 14 before the start of hydrogen filling and a pressure increase rate (filling speed) of the gas pressure of the hydrogen tank 14 during the hydrogen filling. The capacity of the hydrogen tank 14 varies depending on the type of the fuel cell vehicle 10. The plurality of filling speed maps are prepared corresponding to a plurality of classes of capacity of the hydrogen tank 14 divided at the time of creation of the filling protocol.

Two filling speed maps are prepared for each capacity class: a filling speed map for the maximum capacity of the hydrogen tank 14 within the range of the capacity class; and a filling speed map for the minimum capacity of the hydrogen tank 14 within the range of the capacity class. The two filling speed maps have different filling speeds. In the following description, of the two filling speed maps prepared for each capacity class, the filling speed map having a higher filling speed is referred to as a high-speed filling speed map, and the filling speed map having a lower filling speed is referred to as a low-speed filling speed map.

In addition to the filling speed maps associated with the capacity classes of the hydrogen tank 14, a slowest-speed filling speed map is prepared. The filling speed in the slowest-speed filling speed map is set by selecting the slowest filling speed from among the filling speeds of the filling speed maps for all the capacity classes.

[Filling Control Process]

Figure 5:
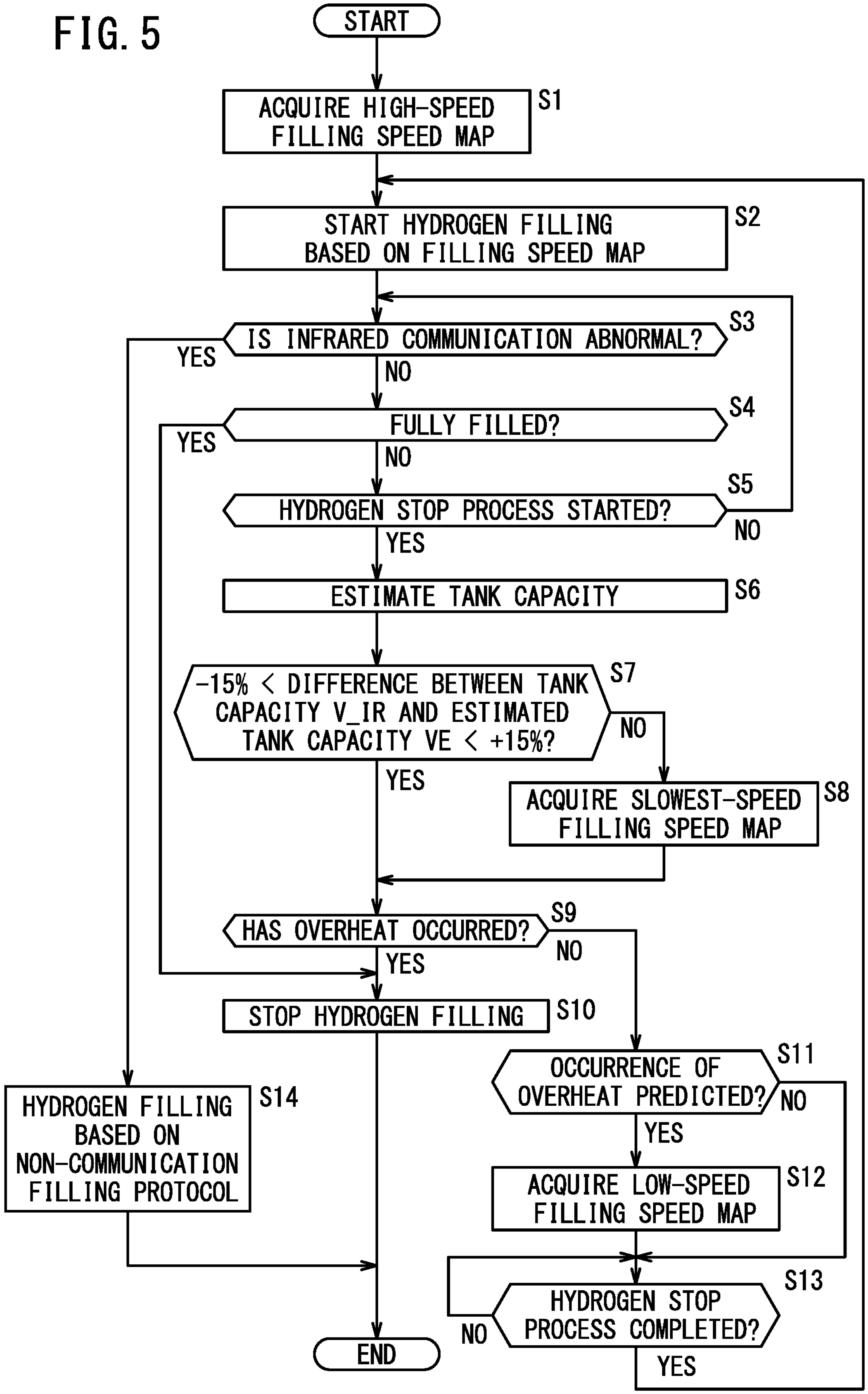
FIG. 5 is a flowchart showing a flow of a filling control process performed in the filling control device.

FIG. 5 is a flowchart showing a flow of a filling control process performed in the filling control device 32.

In step S1, the filling control unit 56 acquires, from the storage unit 44, a high-speed filling speed map corresponding to the capacity class to which the tank capacity V_IR transmitted from the fuel cell vehicle 10 belongs. Thereafter, the process proceeds to step S2.

In step S2, the filling control unit 56 controls the regulating valve 26 based on the acquired filling speed map, and starts filling the hydrogen tank 14 with hydrogen. Thereafter, the process proceeds to step S3.

In step S3, the filling control unit 56 determines whether or not the infrared communication is abnormal. When the infrared communication is abnormal, the process proceeds to step S14. When the infrared communication is normal, the process proceeds to step S4.

In step S4, the filling control unit 56 determines whether or not the hydrogen tank 14 is fully filled. If the hydrogen tank 14 is fully filled, the process proceeds to step S10. If the hydrogen tank 14 is not fully filled, the process proceeds to step S5.

In step S5, the filling control unit 56 determines whether or not the hydrogen stop process is started. When the hydrogen stop process is started, the process proceeds to step S6. When the hydrogen stop process is not started, the process returns to step S3.

The hydrogen stop process is executed during the hydrogen filling. While the hydrogen stop process is performed, the hydrogen filling is temporarily stopped. In the hydrogen stop process, it may be checked whether or not hydrogen leakage has occurred in the hydrogen filling apparatus 12 and the fuel cell vehicle 10. Whether or not hydrogen leakage has occurred is checked based on a change in the filling pressure P_S while the hydrogen filling is stopped.

In step S6, the capacity estimation unit 46 estimates the capacity of the hydrogen tank 14 while the hydrogen stop process is being performed. Thereafter, the process proceeds to step S7.

In step S7, the filling control unit 56 determines whether or not the difference between the tank capacity V_IR and the estimated tank capacity Ve falls within the range of ±15% of the estimated tank capacity Ve (exclusive of the boundary) (i.e., whether −15% of Ve<the difference<+15% of Ve or not). When the difference between the tank capacity V_IR and the estimated tank capacity Ve falls within the range of ±15% of the estimated tank capacity Ve (exclusive of the boundary), the process proceeds to step S9. When the difference between the tank capacity V_IR and the estimated tank capacity Ve falls out of the range of ±15% of the estimated tank capacity Ve (inclusive of the boundary), the process proceeds to step S8.

In step S8, the filling control unit 56 acquires the slowest-speed filling speed map from the storage unit 44. Thereafter, the process proceeds to step S9.

In step S9, the overheat prediction unit 54 estimates the gas temperature inside the hydrogen tank 14 while the hydrogen stop process is performed. Further, the overheat prediction unit 54 determines whether or not overheating (which will be also referred to "overheat" simply) has occurred in the hydrogen inside the hydrogen tank 14. If the overheat has occurred, the process proceeds to step S10. When the overheat has not occurred, the process proceeds to step S11. When the estimated gas temperature Te is equal to or higher than 85° C., the overheat prediction unit 54 determines that overheat has occurred in the hydrogen inside the hydrogen tank 14.

In step S10, the filling control unit 56 stops the hydrogen filling. Thereafter, the filling control process is ended.

In step S11, the overheat prediction unit 54 determines whether or not it is predicted that overheating of hydrogen gas inside the hydrogen tank 14 will occur before the hydrogen tank 14 is fully filled. When the occurrence of overheat is predicted, the process proceeds to step S12. When the occurrence of overheat is not predicted, the process proceeds to step S13. Instead of proceeding to step S12 when the occurrence of overheat is predicted, the process also may proceed to step S10 when the occurrence of overheat is predicted.

In step S12, the filling control unit 56 acquires, from the storage unit 44, a low-speed filling speed map corresponding to the capacity class to which the tank capacity V_IR transmitted from the fuel cell vehicle 10 belongs. Thereafter, the process proceeds to step S13.

In step S13, the filling control unit 56 determines whether or not the hydrogen stop process has been completed. When the hydrogen stop process has been completed, the process returns to step S2. When the hydrogen stop process is not completed, step S13 is repeated.

When the hydrogen stop process has been completed, the process returns to step S2, and the filling control unit 56 controls the regulating valve 26 based on the filling speed map to restart filling of the hydrogen tank 14 with hydrogen. At this time, the filling control unit 56 uses the filling speed map having the slowest filling speed, among the acquired filling speed maps. For example, in a case where the filling control unit 56 acquires three filling speed maps, i.e., a high-speed filling speed map, a low-speed filling speed map, and a slowest-speed filling speed map, the filling control unit 56 controls the regulating valve 26 based on the slowest-speed filling speed map.

In step S14, the filling control unit 56 controls the regulating valve 26 based on the non-communication filling protocol, to fill the hydrogen tank 14 with hydrogen. Thereafter, the filling control process is ended. Since the content of the non-communication filling protocol is known, the description of the content of the non-communication filling protocol will be omitted.

[Operation and Effect]

When the hydrogen tank 14 is filled with hydrogen, the gas pressure inside the hydrogen tank 14 increases and the gas temperature rises. The gas temperature inside the hydrogen tank 14 during hydrogen filling needs to be less than 85° C. When the gas temperature inside the hydrogen tank 14 becomes 85° C. or higher, the hydrogen filling apparatus 12 determines that the hydrogen inside the hydrogen tank 14 is overheated, and stops filling of the hydrogen tank with hydrogen. Therefore, the hydrogen filling apparatus 12 needs to obtain information on the gas temperature inside the hydrogen tank 14 during hydrogen filling.

The gas temperature inside the hydrogen tank 14 during hydrogen filling is detected by the gas temperature detection unit 18 provided in the hydrogen tank 14. The fuel cell vehicle 10 transmits the gas temperature of the hydrogen tank 14 detected by the gas temperature detection unit 18 to the hydrogen filling apparatus 12 as the gas temperature T_IR.

In a case where the fuel cell vehicle 10 is owned by a general individual person, the fuel cell vehicle 10 is not under the control of a hydrogen station operating company or the like. When the fuel cell vehicle 10 is illegally modified or the like, the gas temperature T_IR transmitted from the fuel cell vehicle 10 to the hydrogen filling apparatus 12 may be different from the actual gas temperature inside the hydrogen tank 14. When the hydrogen filling apparatus 12 controls the hydrogen filling, based on the gas temperature T_IR different from the actual gas temperature inside the hydrogen tank 14, the hydrogen filling apparatus 12 cannot appropriately perform the hydrogen filling.

In the hydrogen filling apparatus 12 of the present embodiment, the temperature estimation unit 50 of the filling control device 32 estimates the gas temperature of the hydrogen tank 14 of the fuel cell vehicle 10. The temperature estimation unit 50 estimates the gas temperature without using information transmitted from the fuel cell vehicle 10. The filling control unit 56 of the filling control device 32 controls the hydrogen filling, based on the gas temperature (estimated gas temperature Te) estimated by the temperature estimation unit 50. Thus, even when the gas temperature T_IR transmitted from the fuel cell vehicle 10 to the hydrogen filling apparatus 12 is different from the actual gas temperature inside the hydrogen tank 14, the hydrogen filling apparatus 12 can appropriately perform the hydrogen filling.

In the hydrogen filling apparatus 12 of the present embodiment, the overheat prediction unit 54 of the filling control device 32 predicts whether or not overheating of hydrogen inside the hydrogen tank 14 will occur before the hydrogen tank 14 is fully filled. When the estimated gas temperature Te becomes higher than the determination curve, the overheat prediction unit 54 predicts that overheating of hydrogen inside the hydrogen tank 14 will occur before the hydrogen tank 14 is fully filled.

When it is predicted that the overheating will occur, the filling control unit 56 controls the regulating valve 26 based on the low-speed filling speed map, and fills the hydrogen tank 14 with hydrogen. Since the filling control unit 56 controls the regulating valve 26 based on the low-speed filling speed map, the filling speed of hydrogen is suppressed compared to a case where the regulating valve 26 is controlled based on the high-speed filling speed map. Therefore, the increase rate of the gas temperature inside the hydrogen tank 14 after the occurrence of overheat has been predicted can be made slower than the increase rate of the gas temperature inside the hydrogen tank 14 before the occurrence of overheat is predicted. As a result, the hydrogen filling apparatus 12 can fully fill the hydrogen tank 14 with hydrogen, with no occurrence of overheating of the hydrogen inside the hydrogen tank 14.

In the hydrogen filling apparatus 12 of the present embodiment, the determination curve is acquired from the storage unit 44. In a case where the storage unit 44 stores a determination curve corresponding to the combination of the outside air temperature T_AMB and the precooling temperature T_PC at the time point at which filling of the hydrogen tank 14 with hydrogen is started, the determination curve acquisition unit 52 of the filling control device 32 acquires the determination curve from the storage unit 44. Thus, the overheat prediction unit 54 can predict occurrence of overheating of the hydrogen inside the hydrogen tank 14, based on the determination curve corresponding to the combination of the outside air temperature T_AMB and the precooling temperature T_PC at the time when filling of the hydrogen tank 14 with hydrogen is started.

In the hydrogen filling apparatus 12 of the present embodiment, in a case where the storage unit 44 stores no determination curve corresponding to the combination of the outside air temperature T_AMB and the precooling temperature T_PC at the time point at which filling of the hydrogen tank 14 with hydrogen is started, the determination curve acquisition unit 52 of the filling control device 32 generates a new determination curve. The determination curve acquisition unit 52 acquires determination curves that satisfy both the conditions (A) and (B) described above, from the storage unit 44. The determination curve acquisition unit 52 linearly interpolates the acquired plurality of determination curves to generate a new determination curve. Accordingly, the number of determination curves stored in the storage unit 44 can be reduced, and thus it is possible to decrease the storage capacity requirements of the storage unit 44.

[Inventions that can be Grasped from the Embodiment]

The invention that can be grasped from the above embodiment will be described below.

The method of controlling the hydrogen filling apparatus (12) configured to fill the hydrogen tank (14) of the vehicle (10) with hydrogen, includes: a determination curve acquisition step of acquiring a determination curve from the storage unit (44), the determination curve being a time change model of the temperature of the hydrogen inside the hydrogen tank during filling of the hydrogen tank with the hydrogen; a filling start step of starting filling of the hydrogen tank with the hydrogen; a temperature estimation step of estimating the temperature of the hydrogen inside the hydrogen tank during filling of the hydrogen tank with the hydrogen; an overheat prediction step of predicting that overheating of the hydrogen inside the hydrogen tank will occur before the hydrogen tank is fully filled, if the temperature of the hydrogen inside the hydrogen tank estimated in the temperature estimation step becomes higher than the determination curve; and a filling speed suppressing step of, if it is predicted that the overheating will occur, suppressing a filling speed of the hydrogen so as to be lower than before it is predicted that the overheating will occur or stopping filling of the hydrogen tank with the hydrogen. With the above configuration, the hydrogen filling apparatus can fully fill the hydrogen tank with hydrogen, with no occurrence of overheating of hydrogen inside the hydrogen tank.

In the method of controlling the hydrogen filling apparatus, the storage unit may store a plurality of the determination curves in association with respective combinations of an outside air temperature and a temperature of the hydrogen cooled by the cooling unit configured to cool the hydrogen, and the determination curve acquisition step may acquire, from the storage unit, the determination curve corresponding to the outside air temperature and the temperature of the hydrogen cooled by the cooling unit at a time when filling of the hydrogen tank with the hydrogen is started. With this configuration, the overheat prediction unit can predict the occurrence of overheating of the hydrogen inside the hydrogen tank, based on the determination curve corresponding to the combination of the outside air temperature and the temperature of the hydrogen cooled by the cooling unit at the time of starting filling of the hydrogen tank with the hydrogen.

In the above-described method of controlling the hydrogen filling apparatus, the determination curve acquisition step may include: in a case where the storage unit stores no determination curve corresponding to the outside air temperature and the temperature of the hydrogen cooled by the cooling unit at the time when filling of the hydrogen tank with the hydrogen is started, selecting and acquiring two or more of the determination curves from among the plurality of determination curves, based on the outside air temperature and the temperature of the hydrogen cooled by the cooling unit at the time when filling of the hydrogen tank with the hydrogen is started; and generating a new determination curve, based on the acquired two or more determination curves and the outside air temperature and the temperature of the hydrogen cooled by the cooling unit at the time when filling of the hydrogen tank with the hydrogen is started. With this configuration, the number of determination curves stored in the storage unit can be reduced, and thus it is possible to decrease the storage capacity requirements of the storage unit.

The hydrogen filling apparatus for filling the hydrogen tank of the vehicle with hydrogen, includes: the filling control unit (56) configured to control the filling speed of the hydrogen; the determination curve acquisition unit (52) configured to acquire a determination curve from the storage unit (44), the determination curve being a time change model of a temperature of the hydrogen inside the hydrogen tank during filling of the hydrogen tank with the hydrogen; the temperature estimation unit (50) configured to estimate the temperature of the hydrogen inside the hydrogen tank during filling of the hydrogen tank with the hydrogen; and the overheat prediction unit (54) configured to predict that overheating of the hydrogen inside the hydrogen tank will occur before the hydrogen tank is fully filled, if the temperature of the hydrogen inside the hydrogen tank estimated by the temperature estimation unit becomes higher than the determination curve. If it is predicted that the overheating will occur, the filling control unit suppresses the filling speed of the hydrogen so as to be lower than before it is predicted that the overheating will occur or stops filling of the hydrogen tank with the hydrogen. With the above configuration, the hydrogen filling apparatus can fully fill the hydrogen tank with hydrogen, with no occurrence of overheating of hydrogen inside the hydrogen tank.

In the hydrogen filling apparatus described above, the storage unit may store a plurality of the determination curves in association with respective combinations of an outside air temperature and a temperature of the hydrogen cooled by a cooling unit (28) configured to cool the hydrogen, and the determination curve acquisition unit may acquire, from the storage unit, the determination curve corresponding to the outside air temperature and the temperature of the hydrogen cooled by the cooling unit at a time when filling of the hydrogen tank with the hydrogen is started. With this configuration, the overheat prediction unit can predict the occurrence of overheating of the hydrogen inside the hydrogen tank, based on the determination curve corresponding to the combination of the outside air temperature and the temperature of the hydrogen cooled by the cooling unit at the time of starting filling of the hydrogen tank with the hydrogen.

In the above hydrogen filling apparatus, the determination curve acquisition unit may be configured to: in a case where the storage unit does not store the determination curve corresponding to the outside air temperature and the temperature of the hydrogen cooled by the cooling unit at the time when filling of the hydrogen tank with the hydrogen is started, select and acquire two or more of the determination curves from among the plurality of determination curves, based on the outside air temperature and the temperature of the hydrogen cooled by the cooling unit at the time when filling of the hydrogen tank with the hydrogen is started; and generate a new determination curve, based on the acquired two or more determination curves and the outside air temperature and the temperature of the hydrogen cooled by the cooling unit at the time when filling of the hydrogen tank with the hydrogen is started. With this configuration, the number of determination curves stored in the storage unit can be reduced, and thus it is possible to decrease the storage capacity requirements of the storage unit.

The present invention is not limited to the above disclosure, and various modifications are possible without departing from the essence and gist of the present invention.

What is claimed is:

1. A method of controlling a hydrogen filling apparatus configured to fill a hydrogen tank of a vehicle with hydrogen, the method comprising:
   - maintaining, in a storage unit, a time change model of a transient temperature state of a temperature of the hydrogen inside the hydrogen tank, the time change model prepared in a case where the filling speed is increased as much as possible within a range in which the hydrogen tank does not overheat, and the time change model providing a determination curve indicating a relationship between an elapsed time, which has elapsed since the hydrogen tank starts to be filled with the hydrogen, and the temperature of the hydrogen inside the hydrogen tank;
   - acquiring the determination curve from the time change model stored in the storage unit;
   - starting filling of the hydrogen tank with the hydrogen;
   - continuously estimating, during filling of the hydrogen tank with the hydrogen, the temperature of the hydrogen inside the hydrogen tank;
   - predicting that overheating of the hydrogen inside the hydrogen tank will occur before the hydrogen tank is fully filled, if the estimated temperature of the hydrogen inside the hydrogen tank becomes higher than the determination curve; and
   - if it is predicted that the overheating will occur, suppressing a filling speed of the hydrogen so as to be lower than before it is predicted that the overheating will occur, or stopping filling of the hydrogen tank with the hydrogen.

2. The method of controlling the hydrogen filling apparatus according to claim 1, wherein
   - the time change model stored in the storage unit includes a plurality of the determination curves in association with respective combinations of an outside air temperature and a temperature of the hydrogen cooled by a cooling unit configured to cool the hydrogen, and
   - the acquiring of the determination curve comprises acquiring, from the time change model stored in the storage unit, the determination curve corresponding to the outside air temperature and the temperature of the hydrogen cooled by the cooling unit at a time when filling of the hydrogen tank with the hydrogen is started.

3. The method of controlling the hydrogen filling apparatus according to claim 2, wherein
   - the acquiring of the determination curve further comprises:
   - in a case where the time change model stored in the storage unit includes no determination curve corresponding to the outside air temperature and the temperature of the hydrogen cooled by the cooling unit at the time when filling of the hydrogen tank with the hydrogen is started,
   - selecting and acquiring two or more of the determination curves from among the plurality of determination curves, based on the outside air temperature and the temperature of the hydrogen cooled by the cooling unit at the time when filling of the hydrogen tank with the hydrogen is started; and
   - generating a new determination curve, based on the acquired two or more determination curves and the outside air temperature and the temperature of the hydrogen cooled by the cooling unit at the time when filling of the hydrogen tank with the hydrogen is started.

4. A hydrogen filling apparatus for filling a hydrogen tank of a vehicle with hydrogen, the hydrogen filling apparatus comprising:
   - one or more processors that execute computer-executable instructions stored in a storage unit, wherein the one or more processors execute the computer-executable instructions to cause the hydrogen filling apparatus to:
   - control a filling speed of the hydrogen;
   - maintain, in the storage unit, a time change model of a transient temperature state of a temperature of the hydrogen inside the hydrogen tank, the time change model prepared in a case where the filling speed is increased as much as possible within a range in which the hydrogen tank does not overheat, and the time change model providing a determination curve indicating a relationship between an elapsed time, which has elapsed since the hydrogen tank starts to be filled with the hydrogen, and the temperature of the hydrogen inside the hydrogen tank;
   - acquire the determination curve from the time change model stored in the storage unit;
   - continuously estimate, during filling of the hydrogen tank with the hydrogen, the temperature of the hydrogen inside the hydrogen tank; and
   - predict that overheating of the hydrogen inside the hydrogen tank will occur before the hydrogen tank is fully filled, if the estimated temperature of the hydrogen inside the hydrogen tank becomes higher than the determination curve,
   - wherein if it is predicted that the overheating will occur, the one or more processors cause the hydrogen filling apparatus to suppress the filling speed of the hydrogen so as to be lower than before it is predicted that the overheating will occur or to stop filling of the hydrogen tank with the hydrogen.

5. The hydrogen filling apparatus according to claim 4, wherein
   - the time change model stored in the storage unit includes a plurality of the determination curves in association with respective combinations of an outside air temperature and a temperature of the hydrogen cooled by a cooling unit configured to cool the hydrogen, and
   - the one or more processors cause the hydrogen filling apparatus to acquire, from the time change model stored in the storage unit, the determination curve corresponding to the outside air temperature and the temperature of the hydrogen cooled by the cooling unit at a time when filling of the hydrogen tank with the hydrogen is started.

6. The hydrogen filling apparatus according to claim 5, wherein
   - the one or more processors cause the hydrogen filling apparatus to:
   - in a case where the time change model stored in the storage unit includes no determination curve corresponding to the outside air temperature and the temperature of the hydrogen cooled by the cooling unit at the time when filling of the hydrogen tank with the hydrogen is started,
   - select and acquire two or more of the determination curves from among the plurality of determination curves, based on the outside air temperature and the temperature of the hydrogen cooled by the cooling unit at the time when filling of the hydrogen tank with the hydrogen is started; and
   - generate a new determination curve, based on the acquired two or more determination curves and the outside air temperature and the temperature of the hydrogen cooled by the cooling unit at the time when filling of the hydrogen tank with the hydrogen is started.

7. The method of controlling the hydrogen filling apparatus according to claim 1, wherein the temperature of the hydrogen inside the hydrogen tank is continuously estimated during the filling of the hydrogen tank with the hydrogen based on an equation including pressure inside the hydrogen tank, capacity of the hydrogen tank, a compressibility factor of the hydrogen, mass of the hydrogen inside the hydrogen tank before the hydrogen tank is filled with the hydrogen, mass of the hydrogen filled in the hydrogen tank from when the hydrogen tank starts to be filled with the hydrogen till present time, and a gas constant.

8. The method of controlling the hydrogen filling apparatus according to claim 1, wherein the temperature of the hydrogen inside the hydrogen tank is continuously estimated during the filling of the hydrogen tank with the hydrogen based on an equation $$Te = \frac{Pe \cdot Ve}{Z|Pe,\ Te| \cdot (m0 + dm) \cdot R}$$

where Te denotes the temperature of the hydrogen inside the hydrogen tank, Pe denotes pressure inside the hydrogen tank, Ve denotes capacity of the hydrogen tank, Z denotes a compressibility factor of the hydrogen, m0 denotes mass of the hydrogen inside the hydrogen tank before the hydrogen tank is filled with the hydrogen, dm denotes mass of the hydrogen filled in the hydrogen tank from when the hydrogen tank starts to be filled with the hydrogen till present time, and R denotes a gas constant.

9. The hydrogen filling apparatus according to claim 4, wherein in the estimating the temperature of the hydrogen inside the hydrogen tank, the temperature of the hydrogen inside the hydrogen tank is continuously estimated during the filling of the hydrogen tank with the hydrogen based on an equation including pressure inside the hydrogen tank, capacity of the hydrogen tank, a compressibility factor of the hydrogen, mass of the hydrogen inside the hydrogen tank before the hydrogen tank is filled with the hydrogen, mass of the hydrogen filled in the hydrogen tank from when the hydrogen tank starts to be filled with the hydrogen till present time, and a gas constant.

10. The hydrogen filling apparatus according to claim 4, wherein the temperature of the hydrogen inside the hydrogen tank is continuously estimated during the filling of the hydrogen tank with the hydrogen based on an equation $$Te = \frac{Pe \cdot Ve}{Z|Pe,\ Te| \cdot (m0 + dm) \cdot R}$$

where Te denotes the temperature of the hydrogen inside the hydrogen tank, Pe denotes pressure inside the hydrogen tank, Ve denotes capacity of the hydrogen tank, Z denotes a compressibility factor of the hydrogen, m0 denotes mass of the hydrogen inside the hydrogen tank before the hydrogen tank is filled with the hydrogen, dm denotes mass of the hydrogen filled in the hydrogen tank from when the hydrogen tank starts to be filled with the hydrogen till present time, and R denotes a gas constant.

* * * * *